US009002796B2

(12) United States Patent
Kumagai et al.

(10) Patent No.: US 9,002,796 B2
(45) Date of Patent: Apr. 7, 2015

(54) DATABASE MANAGEMENT METHOD, DATABASE MANAGEMENT SYSTEM AND DATABASE MANAGEMENT PROGRAM

(75) Inventors: Shota Kumagai, Tokyo (JP); Norihiro Hara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 471 days.

(21) Appl. No.: 13/389,548

(22) PCT Filed: Mar. 4, 2010

(86) PCT No.: PCT/JP2010/001527
§ 371 (c)(1),
(2), (4) Date: May 3, 2012

(87) PCT Pub. No.: WO2011/061869
PCT Pub. Date: May 26, 2011

(65) Prior Publication Data
US 2012/0209891 A1    Aug. 16, 2012

(30) Foreign Application Priority Data
Nov. 18, 2009  (JP) .................... 2009-263031

(51) Int. Cl.
*G06F 17/30* (2006.01)
*G06F 11/14* (2006.01)

(52) U.S. Cl.
CPC .... *G06F 17/30581* (2013.01); *G06F 17/30575* (2013.01); *G06F 17/30215* (2013.01); *G06F 11/1448* (2013.01)

(58) Field of Classification Search
CPC .......... G06F 11/1448; G06F 17/30082; G06F 17/30215; G06F 17/30575
USPC .................................................. 707/809, 640
See application file for complete search history.

(56) References Cited

U.S. PATENT DOCUMENTS

| 2006/0101081 A1* | 5/2006 | Lin et al. ...................... 707/200 |
| 2008/0059542 A1* | 3/2008 | Atluri et al. .................. 707/204 |
| 2008/0115071 A1* | 5/2008 | Fair .............................. 715/764 |

FOREIGN PATENT DOCUMENTS

| JP | 2001-160942 | 6/2001 |
| JP | 2001-273175 | 10/2001 |

OTHER PUBLICATIONS

Matsuura, Tatsuo; In-memory Database: Yes you can! Special Edition; Nikkei System Integration, Mar. 2006; Nikkei BP, Feb. 26, 2006, pp. 50-52.

(Continued)

*Primary Examiner* — Jensen Hu
(74) *Attorney, Agent, or Firm* — Foley & Lardner LLP

(57) ABSTRACT

In a database management method, a first database management apparatus comprises a list which holds storage location information indicating a write destination in a second database for data which is added to a first database, the method comprising a first step whereby, when optional data is added to the first database, the first database management apparatus appends the storage location information from the first list to the data, a second step whereby the first database management apparatus transmits the data to which location information has been appended to second database management apparatus and issues a request to add the data to the second database management apparatus, and a third step whereby the second database management apparatus adds the data to the location in the second database indicated by location information appended to the data in response to the data addition request.

18 Claims, 16 Drawing Sheets

(56) References Cited

OTHER PUBLICATIONS

Gray, Jim, et al.; Transaction Processing: Concepts and Techniques; Nikkei BP, Morgan Kaufmann Publishers, San Francisco, USA; 1993.
Buretta, Marie; Data Replication—Tools and Techniques for Managing Distributed Information; Wiley Computer Publishing; 1997; p. 144.
Sugi, Tatsuya, et al.; Data Shori o Kosokuka suru In-Memory Architecture; IT Architext, vol. 23; May 25, 2009; pp. 44-55.
PCT International Search Report and Written Opinion on application No. PCT/JP2010/001527 mailed Mar. 30, 2010; 10 pages.
Architecture and Performance—Applied Architecture of In-Memory Data Grid; IDS Japan, vol. 23, May 25, 2009; 4 pages.

* cited by examiner

Fig.3

| PHYSICAL STORAGE LOCATION INFORMATION | RESERVE UNIT |
|---|---|
| #3-1 | RECORD |
| #3-2 | RECORD |
| #3-3 | RECORD |
| #5 | PAGE |
| #6 | PAGE |
| EXT3 | EXTENT |
| FILE2 | FILE |
| ⋮ | ⋮ |

Fig.4

| TABLE NAME | TABLE 1 |
|---|---|
| RECORD | #3-1 |
| RECORD | #3-2 |
| RECORD | #3-3 |
| PAGE | #5 |
| PAGE | #6 |
| EXTENT | EXT3 |
| FILE | FILE2 |
| : | : |

■TABLE NAME: TABLE 1
RESERVED PHYSICAL STORAGE LOCATION
INFORMATION USAGE RATE = 39.1%

| FILE | EXTENT | PAGE | RECORD | USAGE RATE |
|---|---|---|---|---|
| FILE1 | EXT1 | #3 | #3-1 | 100% |
| | | | #3-2 | 100% |
| | | | #3-3 | 100% |
| | | #5 | ALL | 20% |
| | | #6 | ALL | 0% |
| | EXT3 | ALL | ALL | 0% |
| FILE2 | ALL | ALL | ALL | 0% |

■TABLE NAME: TABLE 2

DATABASE MANAGEMENT METHOD, DATABASE MANAGEMENT SYSTEM AND DATABASE MANAGEMENT PROGRAM

CROSS-REFERENCE TO RELATED PATENT APPLICATIONS

This application is a US national phase application of PCT Application PCT/JP2010/001527 filed Mar. 4, 2010 which claims priority from Japan Application 2009-263031, filed Nov. 11, 2009. All of the aforesaid applications are incorporated herein by reference in their entirety as if fully set forth herein.

TECHNICAL FIELD

The present invention relates to a database management method, a database management system and a database management program and, more particularly, to data replication between an in-memory database and an on-disk database.

BACKGROUND ART

Conventionally, in order to provide a high-speed response to an access request, an in-memory database (hereinafter called an "in-memory DB") affords data residency in a volatile memory, for example, so that time-consuming I/Os to and from an external storage apparatus are not performed or are limited.

By the way, in a database management system, because data disappears from a memory when a system stops, the in-memory DB backs up data to an on-disk database (hereinafter called "on-disk DB") which holds data in an external storage apparatus.

In order to back up data to the on-disk DB, data replication technology which matches the data of the in-memory DB with that of the on-disk DB is required.

In a technology of the data replication, Non-PTL4 discloses a technology which uniquely identifies a record which corresponds to each of the records in the data of the database from data of another database by using an unique index which are defined in tables of two databases to be replicated.

The unique index used in the above data replication technology may not exist in an user database design. In this case, there are problems such as an increase in a labor of the user adding the unique index to the database, an increase in the usage amount of the external storage apparatus due to storing the unique index, and an increase in processing overhead due to updating the unique index.

Against these problems PTL1 discloses a technology which obviates the need to define an unique index by creating a mapping table for physical storage location information between different databases.

Furthermore, when a record is added to the data replication source, not only the data replication source is accessed but also the data replication destination is accessed, physical storage location information, which the data replication destination acquires determined, so that the data replication of the record is completed.

As described in Non-PTL2 and 3 (Non-PTL3 is a translation of Non-PTL2 in Japanese), this is because unused area information is referenced to determine the physical storage location information which is the record addition destination in order to hold information of the unused area in the database.

CITATION LIST

Patent Literature

[PTL1]
Japanese Published Unexamined Application No. 2001-273175

Non-Patent Literature

[Non-PTL1]
Tatsuo Matsuura "In-memory Database: Yes you can! Special Edition, Nikkei System Integration March 2006" Nikkei B P, Feb. 26, 2006, pages 50 to 52.
[Non-PTL2]
Jim Gray and Andreas Reuter, Transaction Processing: Concepts and Techniques, Morgan Kaufmann Publishers, 1993, pages 757 to 760.
[Non-PTL3]
Jim Gray (writer) and Andreas Reuter (writer), Masaru Kitsuregawa (translator), "Transaction Processing: Concepts and Techniques," Nikkei B P, October 2001, pages 897 to 900.
[Non-PTL4]
Marie Buretta "Data Replication: Tools and Techniques for Managing Distributed Information" WILEY COMPUTER PUBLISHING, 1997, page 144.

SUMMARY OF THE INVENTION

Technical Problem

However, with the technology of PTL1, it is not possible to delete information, which is used during the data replication such as SQL etc. executed in the data replication destination, by the data replication is completed, for preparing a re-execution when data replication is failed due to a fault etc. in the external storage apparatus of the data replication destination.

At this point, in order to use an in-memory DB in a system where a large amount of data is processed at high speed as described above, an addition of records may continuously be required. Accordingly, once data replication is delayed, information used during the data replication is accumulated without being deleted and, as a result of the capacity of the external storage apparatus being compressed, output of new information is no longer possible and a record cannot be added to the in-memory DB.

The present invention was conceived in view of the above points and proposes a database management method, a database management system and a database management program which enable to perform data replication at high speed during data replication when records are added to an in-memory DB and to continuously accept the addition of records to the in-memory DB.

Solution to Problem

In order to solve this problem, an aspect of the present invention provides a database management method for a system in which a first database management apparatus including a primary memory where a first database is disposed and a second database management apparatus including a secondary memory where a second database is disposed are connected via a network and the first and second database management apparatuses copy stored data to and from one another, the first database management apparatus including a first list which holds storage location information indicating a write destination in the second database for data which is added to the first database, the database management method comprising a first step whereby the first database management apparatus, when optional data is added to the first database, appends the storage location information from the first list to the data; a second step whereby the first database management apparatus transmits the data to which the storage location information has been appended to the second database management apparatus and issues a request to add the data to the second database management apparatus; and a third step whereby the second database management apparatus adds the data to the storage location in the second database indicated by the storage location information appended to the data in response to the data addition request from the second database management apparatus.

Furthermore, an aspect of the present invention provides a database management method for a system in which a first database management apparatus including a primary memory where a first database is disposed and a second database management apparatus including a secondary memory where a second database is disposed are connected via a network and the first and second database management apparatuses copy stored data to and from one another, wherein the first database management apparatus comprises a first list which holds storage location information indicating a write destination in the second database for data which is added to the first database, wherein the first database management apparatus, when optional data is added to the first database, appends the storage location information from the first list to the data, transmits the data to which the storage location information was appended to the second database management apparatus, and issues a request to add the data to the second database management apparatus, and wherein the second database management apparatus adds the data to the storage location in the second database indicated by the storage location information appended to the data in response to the data addition request from the first database management apparatus.

In addition, an aspect of the present invention provides a database management program causing a first database management apparatus, which is connected to a second database management apparatus including a secondary memory where a second database is disposed and which comprises a primary memory where a first database is disposed and comprises a first list holding storage location information indicating a write destination in the second database for data which is added to the first database, to execute a first step of, when optional data is added to the first database, appending the storage location information from the first list to the data; and a second step of transmitting the data to which the storage location information has been appended to the second database management apparatus and issuing a request to add the data to the second database management apparatus.

Advantageous Effects of Invention

With the present invention, it is possible to provide a database management method, a database management system and a database management program which enable to continuously accept the addition of a record to a first database.

BRIEF DESCRIPTION OF DRAWINGS

FIG. 3 is a diagram serving to illustrate a reserve instruction list.

FIG. 4 is a diagram serving to illustrate a location information reserve parameter file.

FIG. 14 shows an example of a display result of reserved physical storage location information.

DESCRIPTION OF EMBODIMENTS

An embodiment of the present invention will be described in detail hereinbelow with reference to the drawings.

Figure 1:
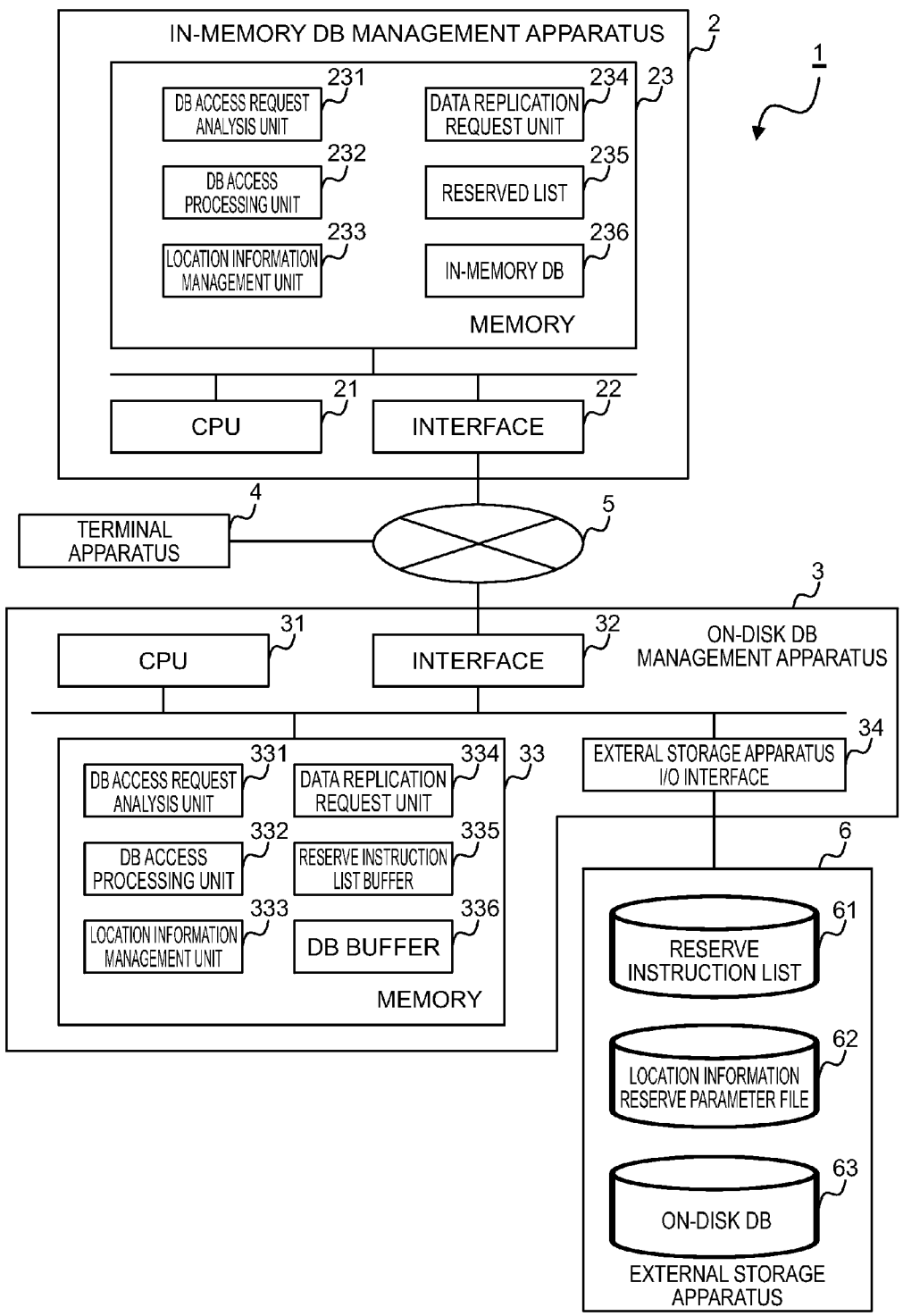
FIG. 1 is a block diagram showing the configuration of a database management system according to the present embodiment.

(1) Hardware Configuration of Database Management System in the Present Embodiment In FIG. 1, 1 generally refers to the database management system according to the present embodiment. The database management system 1 is coupled via a network 5 to an in-memory DB management apparatus 2 (equivalent to a "first database management apparatus"), an on-disk DB management apparatus 3 (equivalent to a "second database management apparatus"), and a terminal apparatus 4. Furthermore, the on-disk DB management apparatus 3 is connected to an external storage apparatus 6.

The in-memory DB management apparatus 2 performs management in a case where there is an access request to access the in-memory database 236 from the terminal apparatus 4 and performs copying to an on-disk DB 63 (equivalent to a second database) in a case where there is a change in the data of the in-memory database 236, and so on.

The CPU 21 is a processor which governs operations control of the whole in-memory DB management apparatus 2 and executes the processing required on the basis of various control programs which are stored in the memory 23. The interface 22 is connected to the network 5 and performs protocol control during communications between the on-disk DB management apparatus 3 or the terminal apparatus 4 and the in-memory DB management apparatus 2.

The memory 23 is configured from a semiconductor memory or a hard disk or the like and, in addition to being used to save control programs such as the OS (Operating System), is also used as the working memory of the CPU 21.

Further, the memory 23 stores a DB access request unit 231, a DB access processing unit 232, a location information management unit 233, a reserved list 235 (equivalent to "first list"), and an in-memory DB 236 (equivalent to "first database").

The DB access request analysis unit 231 analyzes the request from the terminal apparatus 4 or the on-disk DB management apparatus 3 and, according to the analyzed request, issues a request for access to the in-memory DB 236 to the DB access processing unit 232.

The DB access processing unit 232 accesses the in-memory DB 236 according to the request from the DB access request analysis unit 231.

If the access request to the in-memory DB 236 is for the addition of a record, the location information management unit 233 acquires physical storage location information indicating the write destination in the on-disk DB 63 of the record added to the in-memory DB 236 from the reserved list 235.

On an aside, in the present embodiment, although an example in which the physical storage location (for example, the physical address of the HDD or the like) is applied as data storage location information is described, logical storage location information (for example, the logical address of a logical volume configured from a HDD or the like) may also serve as the data storage location information.

If the in-memory DB 236 is subject to an update, addition, or deletion or the like, the data replication request unit 234 issues a request to the on-disk DB management apparatus 3 to copy the update, addition or deletion to the on-disk DB 63 ("equivalent to second database").

Figure 2:
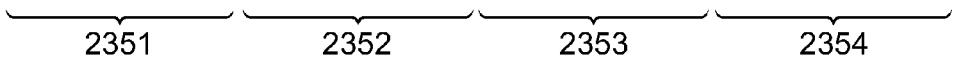
FIG. 2 is a diagram serving to illustrate a reserved list.

The reserved list 235 stores physical storage location information which indicates the copy destination in the on-disk DB 63 of the record added to the in-memory DB 236. Describing the explanation in detail, as shown in FIG. 2, the reserved list 235 is formed as a table format, and configured from a reserved physical storage location information field 2351 which shows the copy destination in the on-disk DB 63 of the record added to the in-memory DB 236, a state field 2352 which shows the state thereof (in use or unused), a reserved physical storage location information count field 2353, and an in-use physical storage location information count field 2354. Furthermore, the reserved list 235 is created on the basis of the reserve instruction list 61 described later.

Figure 5:
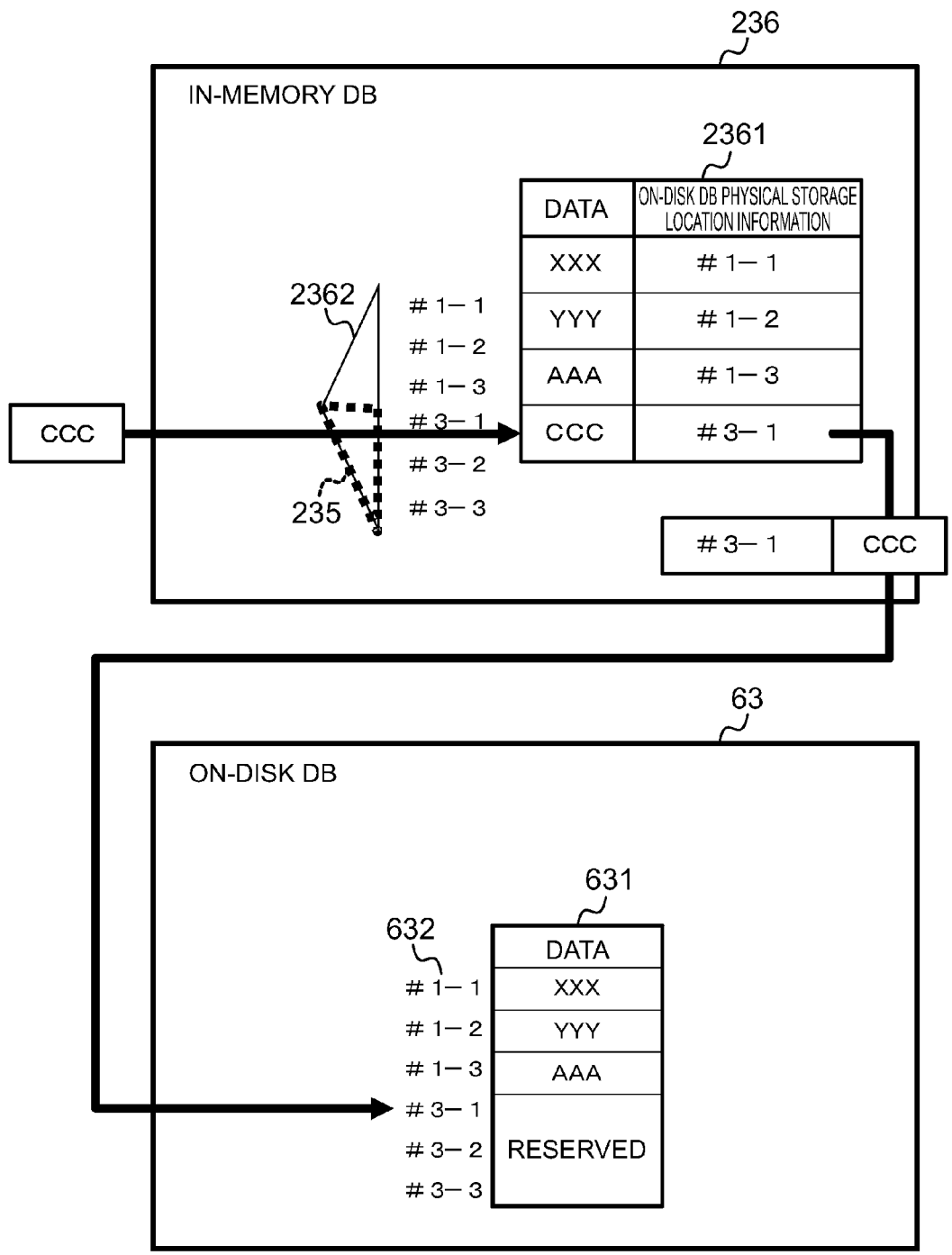
FIG. 5 is a conceptual diagram serving to illustrate the operation of the database management system according to the present embodiment.
Figure 6:
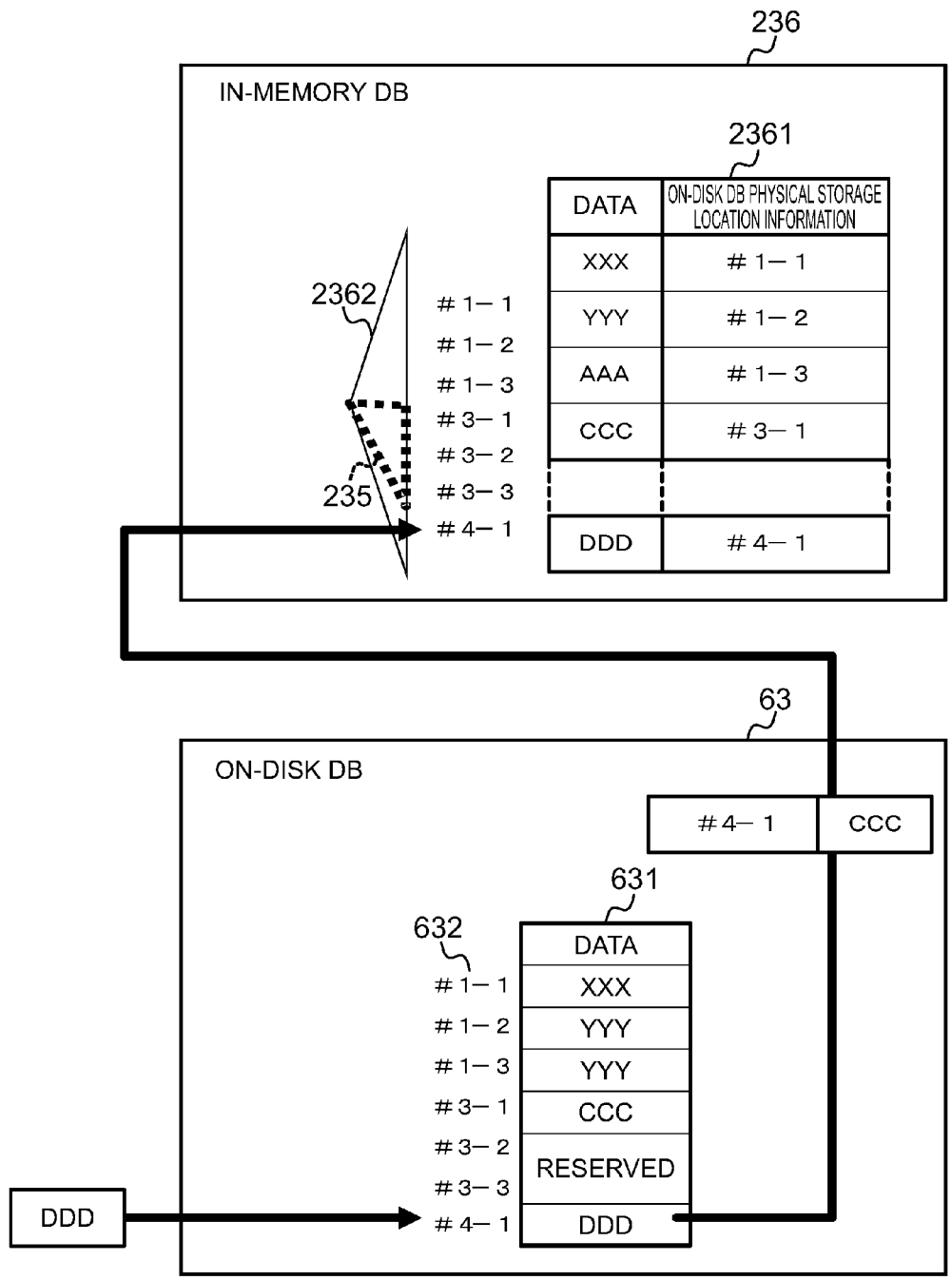
FIG. 6 is a conceptual diagram serving to illustrate the operation of the database management system according to the present embodiment.

The in-memory DB 236 is a database formed in semiconductor memory and, as shown in FIGS. 5 and 6, comprises a table 2361 and an index 2362.

The table 2361 is configured from data and information on the physical storage location of the data in the on-disk DB 63 corresponding to the data. The index 2362 is used to retrieve the data in the table 2361 and here information on the physical storage location of the data in the on-disk DB 63 is used.

The on-disk DB management apparatus 3 issues inquiries to the on-disk DB 63 where the external storage apparatus 6 is stored and performs management of the whole on-disk DB 63 such as resource management. Furthermore, the on-disk DB management apparatus 3 comprises a CPU 31, an index 32, a memory 33, and an external storage apparatus I/O interface 34.

The CPU 31 is a processor which governs operations control of the whole on-disk DB management apparatus 3 and executes the required processing on the basis of various control programs which are stored in the memory 33. The interface 32 is connected to the network 5 and performs protocol control during communications between the in-memory DB management apparatus 2 or terminal apparatus 4 and the on-disk DB management apparatus 3.

The memory 33 is configured from a semiconductor memory and hard disk or the like and, in addition to being used to hold a control program such as an OS (Operating System), is also used as the working memory of the CPU 31. Further, the memory 33 stores a DB access request unit 331, a DB access processing unit 332, a location information management unit 333, a data replication request unit 334, a reserve instruction list buffer 335, and a DB buffer 336.

The DB access request analysis unit 331 analyzes requests from the terminal apparatus 4 or in-memory DB management apparatus 2 and requests access to the on-disk DB 63 to the DB access processing unit 332.

The DB access processing unit 332 accesses the on-disk DB 63 via the DB buffer 336 according to the request from the DB access request analysis unit 331.

If the access request to the on-disk DB 63 is for the addition of a record, the location information management unit 333 refers to the reserve instruction list 61 via the reserve instruction list buffer 335 and acquires physical storage location information which has not been registered in the reserve instruction list 61 (equivalent to "second list").

If there is an update in the on-disk DB 63, the data replication request unit 334 issues a request to the in-memory DB management apparatus 2 to copy the update to the in-memory DB 236.

The on-disk DB management apparatus 3 is connected via the I/O interface 250 to the external storage apparatus 6.

The external storage apparatus 6 stores the reserve instruction list 61, the location information reserve parameter file 62, and the on-disk DB 63.

As shown in FIG. 3, the reserve instruction list 61 is configured from a physical storage location information field 611 which indicates the copy destination in the on-disk DB 63 of the record added to the in-memory DB 236 reserved by the user and a reserve unit field 612 which shows the units of this size. The on-disk DB management apparatus 3 refers to the reserve instruction list 61 via the reserve instruction list buffer 335. The reserve units are the units with which the user reserves the physical storage location and are any of files, extents, pages, and records. At this point, files are units for storing data in the database as a single cluster in the external storage apparatus 6. Extents are units which for allocating area in the files and are configured from one or more pages. The page is an I/O unit of the external storage apparatus and is configured from one or more records.

The location information reserve parameter file 62 is a file created in advance in order for the user to reserve physical storage location information. The reserve instruction list 61 is created by reading a plurality of location information reserve parameter files 62. In the location information reserve parameter file 62, reserved physical storage location information is registered at each table. In addition to record units, reserve units may be designated as units which bundle a plurality of records such as a file, extent and page. For example, in the example shown in FIG. 4, in the location information reserve parameter file 62 with the name "Table 1", "#3-1", #3-2", and #3-3" are reserved at a record unit, "#5" and "#6" are reserved as a page unit, "EXT3" is reserved as an extent unit, and "FILE2" is reserved as a file unit.

The on-disk DB 63 is formed in a hard disk device and comprises a table 631 as shown in FIGS. 5 and 6. The table 631 holds each of the data in each of the storage locations indicated by the physical storage location 632. On an aside, in the present invention, an example is explained in the present embodiment in which the on-disk DB 63 is formed in a hard disk device, however, a variety of storage devices can be applied as long as same function as storage areas of secondary storage memory, if the memory 23 of the in-memory DB management apparatus 2 is placed as a primary storage memory. For example, an optical disk or nonvolatile semiconductor device (an SSD (Solid state disk), for example) or the like may also be used. In the present embodiment, "disk" is regarded to include a rotating magnetic disk (HDD or the like), an optical disk, and a nonvolatile semiconductor device.

(2) Outline of Operation of Database Management System

Next, the outline of an operation of the database management system 1 will be described referring to FIGS. 5 and 6.

If an addition request to add a record ("CCC" in the example in FIG. 5) is received, the in-memory DB 236 adds the record "CCC" to the table 2361 together with reserved physical storage location information "#3-1" which is acquired by referencing the index 2362 and the reserved list 235.

Thereafter, the in-memory DB 236 appends the physical storage location information "#3-1" to the record "CCC" and transmits same to the on-disk DB 63, and issues an addition request to add the record to the on-disk DB 63.

The on-disk DB 63 receives the record addition request and adds the record "CCC" to the location indicated by the physical storage location information "#3-1" in table 112.

As mentioned above, the database management system 1 refers to the reserved list 235 when adding the record to the in-memory DB 236 and determines the physical storage location information 632 of the on-disk DB 63 which is the data replication destination. As a result, the replication destination can be discriminated by the in-memory DB management apparatus 236 which is the data replication source even without referring to the table 631 of the on-disk DB 63, and the data replication performance can be improved.

Also, if an addition request to add a record ("DDD" in the example of FIG. 6) is received, the on-disk DB 63 adds the record "DDD" to the table 631. At this time, the on-disk DB 63 refers to the reserve instruction list 61 via the reserve instruction list buffer 335 so that the record is not stored in a physical storage location ("#3-1", "#3-2" and "#3-3" in the example of FIG. 6) registered in the reserve instruction list 61.

Afterward, the on-disk DB 63 appends physical storage location information 113 ("#4-1" in the example of FIG. 6) which indicates the location where the record "DDD" is stored to the record "DDD" and transmits same to the in-memory DB 236 and issues a request to add the record "DDD" to the in-memory DB 236.

The in-memory DB 236 receives the addition request to add the record "DDD" and adds the record "DDD" and the physical storage location information "#4-1" to an unused area of the table 2361. Furthermore, the in-memory DB 236 adds the physical storage location information "#4-1" to the index 2362.

As mentioned above, if a record is added to the on-disk DB 63, the database management system 1 configures the physical storage location information 632 of the on-disk DB 63, which is the addition destination of the record, in the table 2361 of the in-memory DB 236. The record added to the in-memory DB 236 does not utilize the reserved physical storage location information and there is no need to change the reserved list 235.

(3) Specific Processing of Database Management system 1

(3-1) In-Memory Database Update Processing

Figure 7:
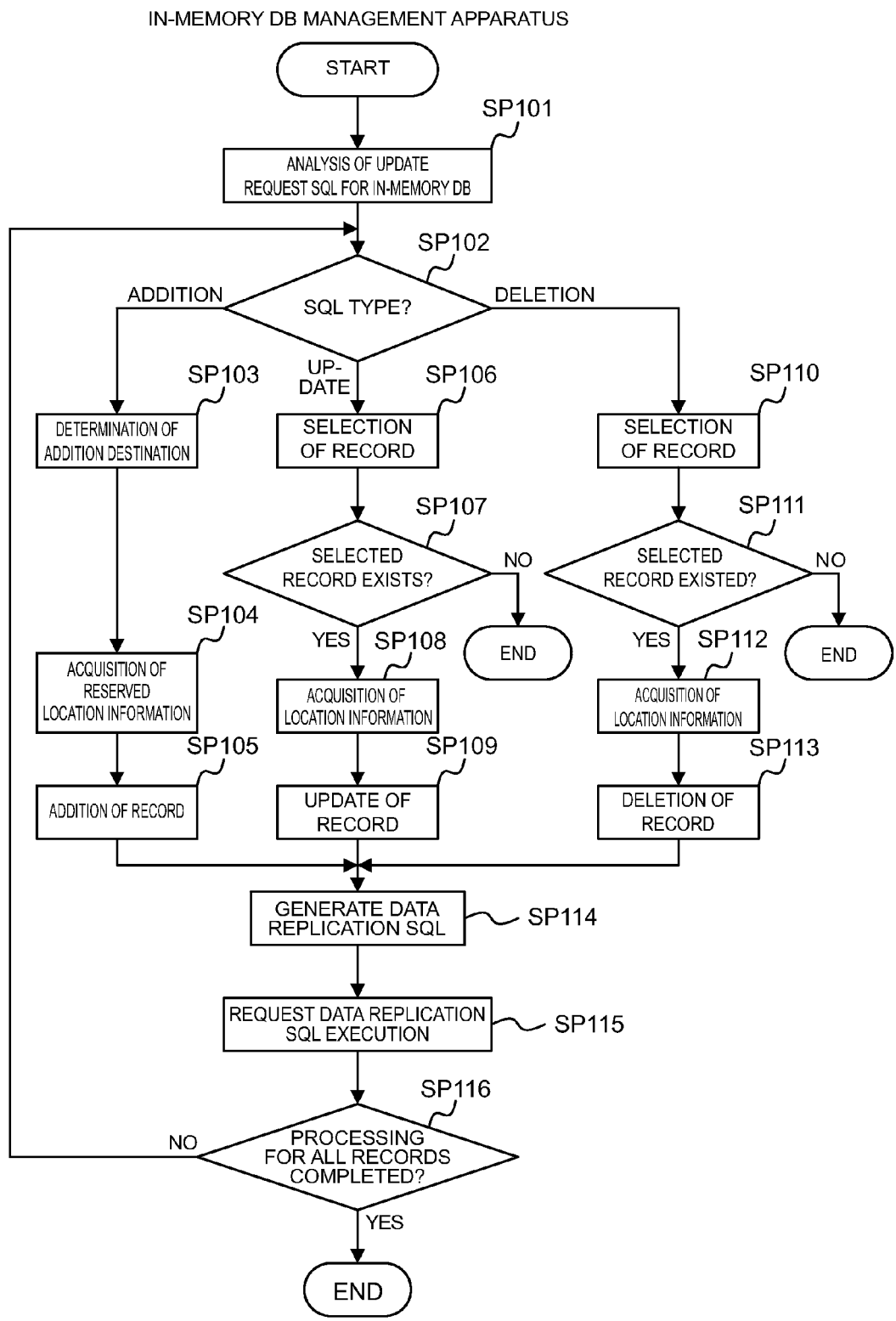
FIG. 7 is a flowchart serving to illustrate in-memory database update processing.

At this point, update processing to update the in-memory DB 236 if there is an update request to update the in-memory DB 236 from the terminal apparatus 4 will be described with reference to FIG. 7.

Initially, when the in-memory DB management apparatus 2 receives an update request SQL from the terminal apparatus 4, the DB access request analysis unit 231 of the in-memory DB management apparatus 2 performs an analysis of the update request SQL for the in-memory DB 236 from the terminal apparatus 4 and determines the SQL type (SP101), and discriminates whether the SQL type is Addition, Update or Deletion (SP102).

If the SQL type is Addition in Step SP102, the DB access processing unit 232 determines the record addition destination (SP103). The location information management unit 233 refers to the reserved list 235 and acquires one reserved physical storage location information item from the top of the reserved list 104 (SP104) and the DB access processing unit 232 adds the acquired reserved physical storage location information and the record to the table 2361 (SP105), and advances to Step SP114.

If the SQL type is Update in Step SP102, the DB access processing unit 232 selects a record to update (SP106) and discriminates whether the selected record exists (SP107). If a negative result is obtained in Step SP107 (SP107: NO), [the DB access processing unit 232] ends the processing. If an affirmative result is obtained in Step SP107 (SP107:YES), the location information management unit 233 refers to the index 2362 and acquires physical storage location information (SP108) and the DB access processing unit 232 updates the record in the table 2361 (SP109) and advances to Step SP114.

In a case where the SQL type is Deletion in Step SP102, the DB access processing unit 262 selects the record to delete (SP110) and discriminates whether the selected record exists (SP111). If a negative result is obtained in Step SP111 (SP111: NO), the DB access processing unit 262 ends the processing. If an affirmative result is obtained in Step SP111 (SP111:YES), the location information management unit 263 refers to the index 2362 and acquires physical storage location information (SP112) and the DB access processing unit 262 deletes the record in the table 2361 (SP113) and advances to Step SP114.

After the record has been added, updated or deleted in Steps SP105, SP109, and SP113, the data replication request unit 234 generates a data replication SQL for performing data replication on the on-disk DB 111 (SP114). However, the data replication SQL contains records to which the acquired physical storage location information has been appended. Further, the data replication request unit 234 transmits the data replication SQL to the on-disk DB management apparatus 3 and requests execution thereof (SP115).

Thereafter, the in-memory DB management apparatus 2 discriminates whether the processing of all the records in the SQL is complete (SP116). If an affirmative result is obtained in Step SP116 (SP116: YES) and ends the processing. If a negative result is obtained in Step SP116 (SP116: NO), and repeats the processing starting with Step SP102.

(3-2) On-Disk Database Committing Processing

Figure 8:
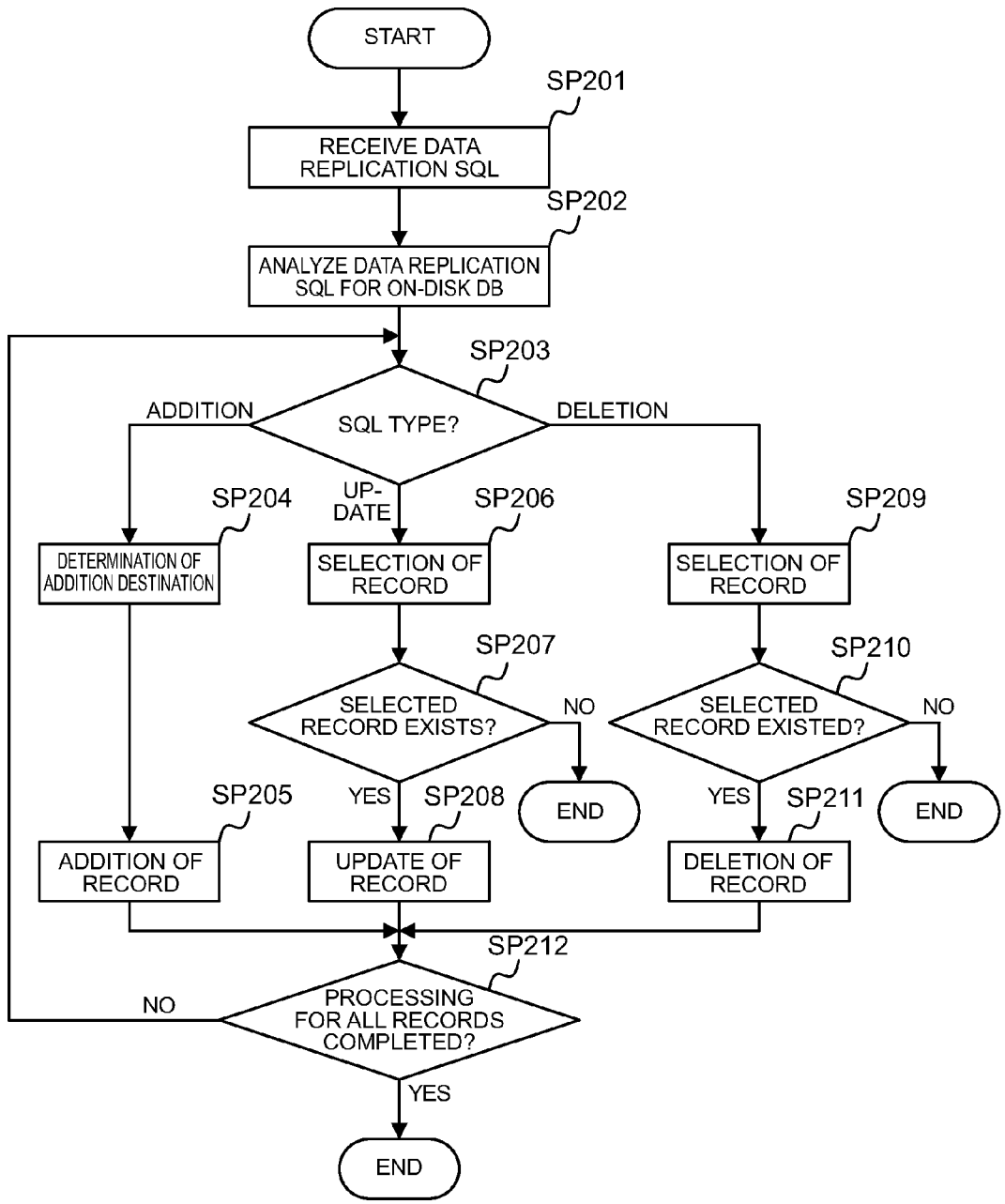
FIG. 8 is a flowchart serving to illustrate on-disk database committing processing.

Next, processing to copy to the on-disk DB 63 when the in-memory DB 236 is updated will be explained referring FIG. 8.

If the DB access request analysis unit 331 of the on-disk DB management apparatus 3 receives the data replication SQL which the in-memory DB management apparatus 2 transmits in Step SP115 (SP201), the DB access request analysis unit 331 performs analysis of the data replication SQL for the on-disk DB 63 and determines the SQL type (SP202) and discriminates whether the SQL type is Addition, Update or Deletion (SP203).

If the type of the data replication SQL is Addition in Step SP203, the DB access processing unit 332 discriminates the addition destination of the record contained in the data replication SQL from the physical storage location information contained in the data replication SQL (SP204). Further, the DB access processing unit 332 adds a record to the addition destination determined in Step SP204 in table 631 (SP205) and advances to Step SP212.

If the SQL type is Update in Step SP203, the DB access processing unit 332 selects the record to be updated (SP206), and discriminates whether the selected record exists (SP207). If a negative result is obtained in Step SP207 (SP207: NO) and ends the processing. If an affirmative result is obtained in Step SP207 (SP207: YES), the DB access processing unit 332 updates the records stored in the storage location indicated by the physical storage location information contained in the data replication SQL in table 631 (SP208) and advances to Step SP212.

If the SQL type is Deletion in Step SP203, the DB access processing unit 332 selects the record to delete (SP209) and discriminates whether the selected record exists (SP210). If a negative result is obtained in Step SP210, the DB access processing unit 332 ends the processing (SP210: NO). If an affirmative result is obtained in Step SP210 (SP210: YES), the DB access processing unit 332 deletes the record stored in the storage location indicated by the physical storage location information contained in the data replication SQL in the table 631 (SP211) and advances to Step SP212.

After the record is added, updated, or deleted in Step SP205, SP208, and SP211, the on-disk DB management apparatus 3 discriminates whether the processing is complete for all the records in the SQL (SP212). If an affirmative result is obtained in Step SP212 (SP212: YES), the on-disk DB management apparatus 3 ends the processing. If a negative result is obtained in Step SP212 (SP212: NO), the on-disk DB management apparatus 3 repeats the processing starting with Step SP203. The update of the in-memory DB 236 is replicated to the on-disk DB 63 as above mentioned.

(3-3) On-Disk Database Update Processing

Figure 9:
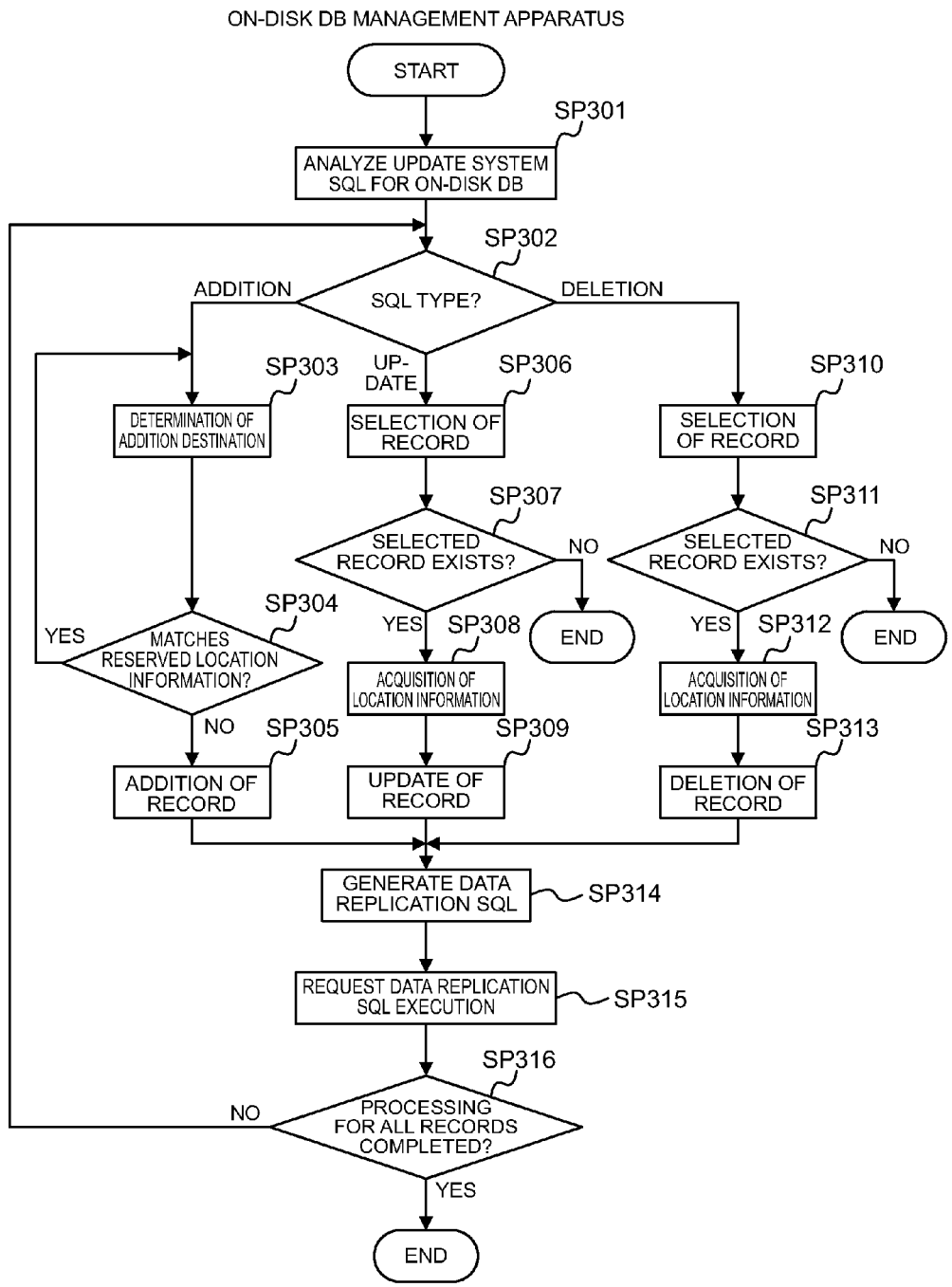
FIG. 9 is a flowchart serving to illustrate on-disk database update processing.

Next, processing to update the on-disk DB 63 if there is an update request to update the on-disk DB 63 from the terminal apparatus 4 will be described later referring FIG. 9.

Initially, when the on-disk DB management apparatus 3 receives an update-system SQL for the on-disk DB 63 from the terminal apparatus 4, the DB access request analysis unit 331 of the on-disk DB management apparatus 3 performs an analysis of the received update request SQL, determines the SQL type (SP301), and discriminates whether the SQL type is Addition, Update or Deletion (SP302).

If the SQL type is Addition in Step SP302, the DB access processing unit 332 determines an addition destination of the record (SP303). The location information management unit 263 refers to the reserve instruction list 61 and discriminates whether the addition destination matches the physical storage location information with the reserve instruction (SP304). If an affirmative result is obtained in Step SP304 (SP304: YES), and returns to Step SP303. If a negative result is obtained in Step SP304 (SP304: NO), the location information management unit 263 adds the record to the addition destination determined in Step SP303 (SP305) and advances to Step SP314.

If the SQL type is Update in Step SP302, the DB access processing unit 332 selects the record to update (SP306) and discriminates whether the selected record exists or not (SP307). If a negative result is obtained in Step SP307 (SP307: NO), the DB access processing unit 332 terminates the processing. If an affirmative result is obtained in Step SP307 (SP307: YES), the location information management unit 333 acquires the physical storage location information (SP308) and the DB access processing unit 332 performs a record update (SP309).

If the SQL type is Deletion in Step SP302, the DB access processing unit 332 selects a record to delete (SP310) and discriminates whether the selected record exists or not (SP311). If a negative result is obtained in Step SP311 (SP311: NO), the DB access processing unit 332 ends the processing. If an affirmative result is obtained in Step SP311 (SP311: YES), the location information management unit 333 acquires physical storage location information (SP312) and the DB access processing unit 332 deletes the record (SP313).

After the record has been added, updated or deleted in Steps SP305 and SP309, and SP313, the data replication request unit 334 generates a data replication SQL for performing data replication on the in-memory DB 236 (SP314). However, the data replication SQL contains records to which the addition destination physical storage information or the acquired physical storage location information has been appended. Further, the data replication request unit 334 transmits the data replication SQL to the in-memory DB management apparatus 2 and requests the execution above (SP315).

Thereafter, the on-disk DB management apparatus 3 discriminates whether the processing is complete for all the records in the SQL (SP316). If an affirmative result is obtained in Step SP316 (SP316: YES), the on-disk DB management apparatus 3 ends the processing. If a negative result is obtained in Step SP316 (SP316: NO), the on-disk DB management apparatus 3 repeats the processing starting with Step SP302.

(3-4) In-Memory Database Committing Processing

Figure 10:
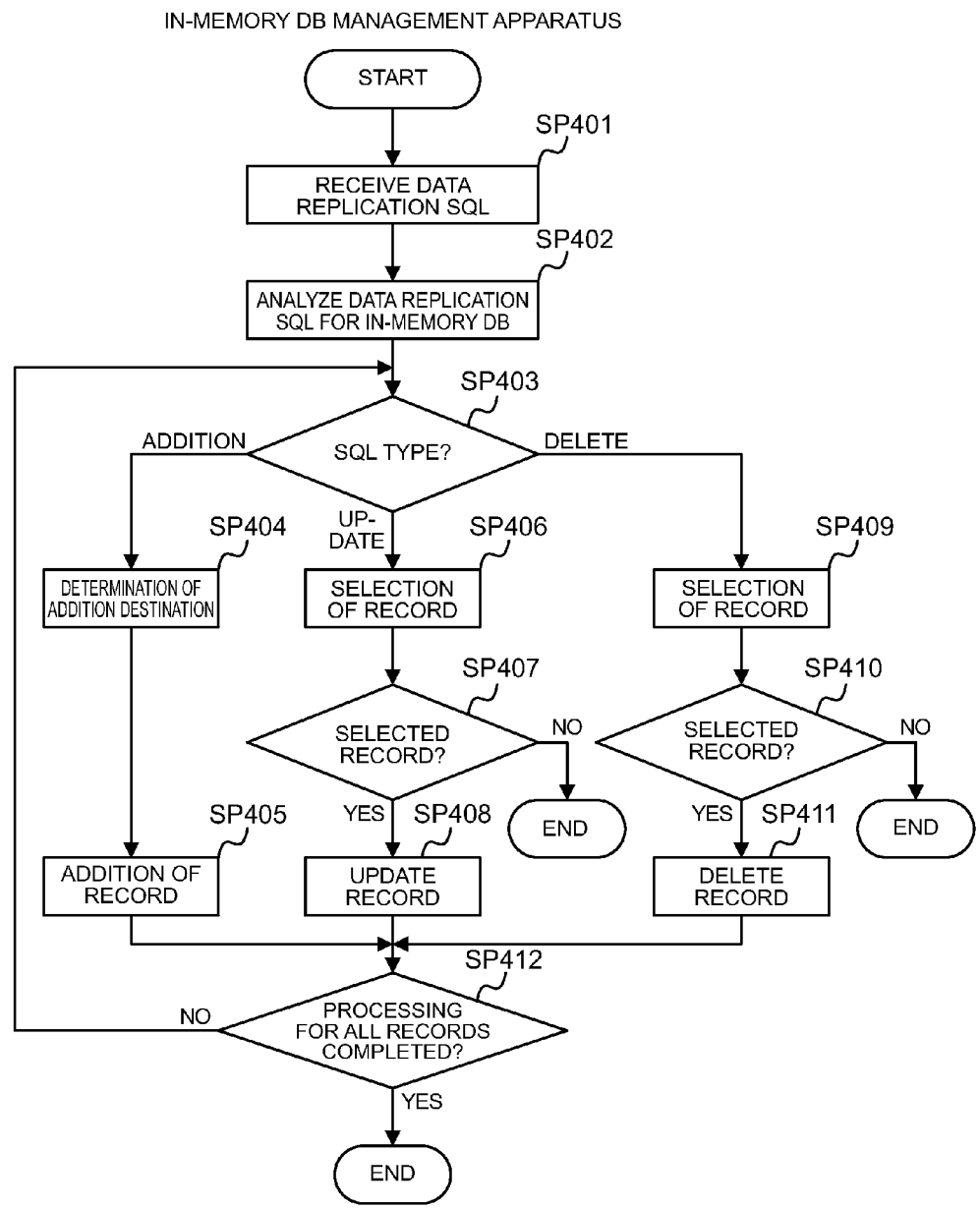
FIG. 10 is a flowchart serving to illustrate in-memory database committing processing.

Next, Committing processing to the in-memory DB 236 if there is an update to the on-disk DB 63 will be described later referring FIG. 10.

If the DB access request analysis unit 231 of the in-memory DB management apparatus 2 receives the data replication SQL transmitted by the on-disk DB management apparatus 3 in Step SP315 (SP401), the DB access request analysis unit 231 performs analysis of the data replication SQL for the in-memory DB 236, determines the SQL type (SP402), and discriminates whether the SQL type is Addition, Update or Deletion (SP403).

If the data replication SQL type is Addition in Step SP403, the DB access processing unit 232 discriminates the record addition destination contained in the data replication SQL from the physical storage location information contained in the data replication SQL (SP404). Furthermore, the DB access processing unit 232 adds the record to the addition destination discriminated in Step SP404 in the table 2361 (SP405), and advances to Step SP412.

If the SQL type is Update in Step SP403, the DB access processing unit 232 selects a record to update (SP406) and discriminates whether the selected record exists or not (SP407). If a negative result is obtained in Step SP407

(SP407: NO), [the DB access processing unit 232] ends the processing. If an affirmative result is obtained in Step SP407 (SP407: YES), the DB access processing unit 232 updates the record stored in the storage location indicated by the physical storage location information contained in the data replication SQL in the table 2361 (SP408), and advances to Step SP412.

In a case where the SQL type is Deletion in Step SP403, the DB access processing unit 232 selects the record to delete (SP409) and discriminates whether the selected record exists or not (SP410). If a negative result is obtained in Step SP410 (SP410: NO), the processing is terminated. If an affirmative result is obtained in Step SP410 (SP410: YES), the DB access processing unit 232 deletes the record stored in the storage location indicated by the physical storage location information contained in the data replication SQL in the table 2361 (SP411) and advances to Step SP412.

After the record has been added, updated or deleted in Steps SP405, SP408 and SP411, the in-memory DB management apparatus 2 discriminates whether the processing is complete for all the records in the SQL or not (SP412). If an affirmative result is obtained in Step SP412 (SP412: YES), the processing is terminated. If a negative result is obtained in Step SP412 (SP412: NO), the in-memory DB management apparatus 2 repeats the processing starting with Step SP403. The update of the in-memory DB 236 is replicated to the on-disk DB 63 as mentioned above.

(3-5) Reserved List Creation Processing

Figure 11:
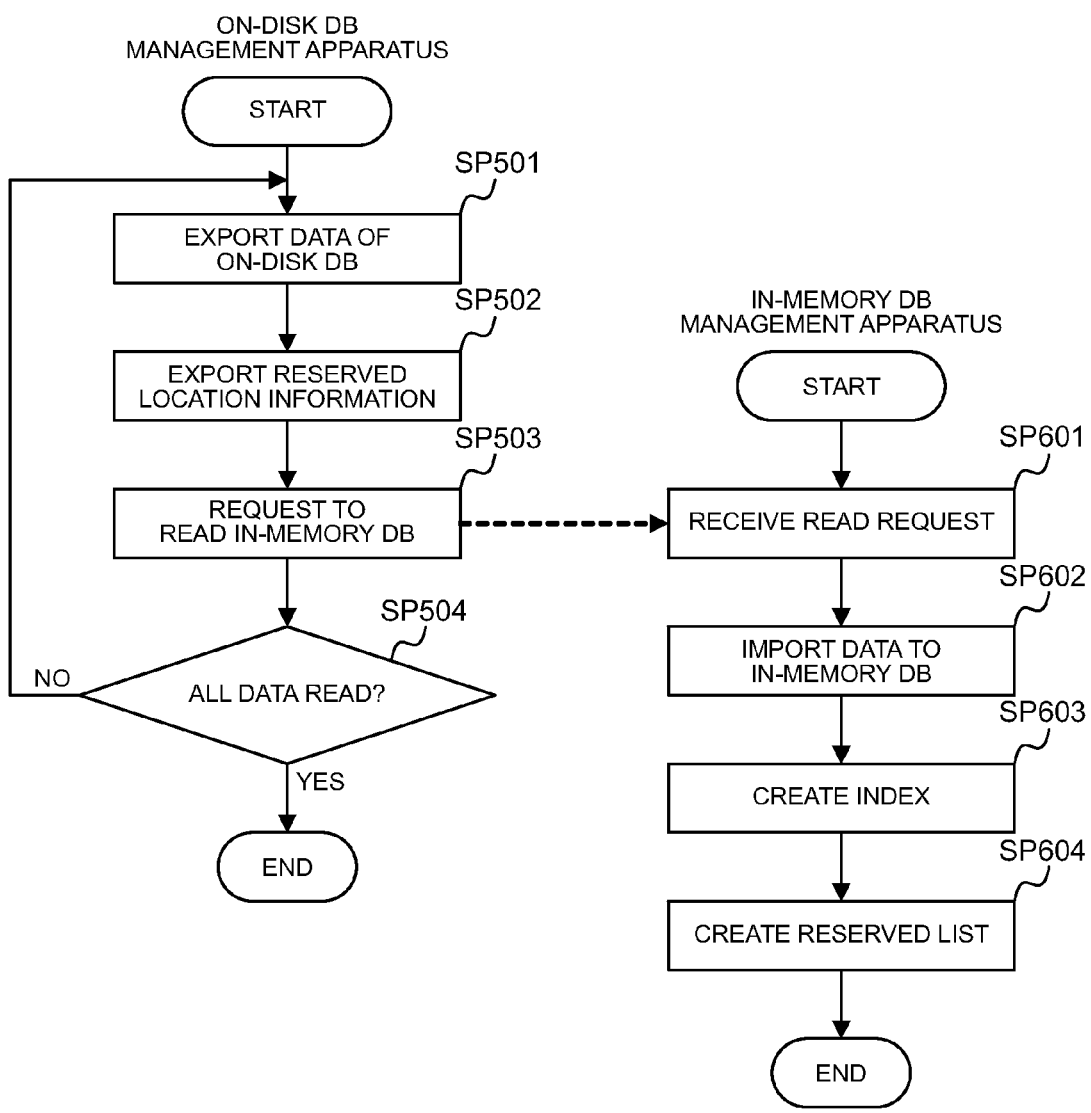
FIG. 11 is a flowchart serving to illustrate reserved list creation processing.

At this point, processing to create the reserved list 235 through co-operation between the in-memory DB management apparatus 2 and on-disk DB management apparatus 3 will be described referring to FIG. 11. The in-memory DB management apparatus 2 creates the reserved list 104 after creating the in-memory DB 236.

Firstly, if the in-memory DB 236 is created, the in-memory DB management apparatus 2 notifies the on-disk DB management apparatus 3 that the in-memory DB 236 has been created.

When the on-disk DB management apparatus 3 receives this notification, the DB access processing unit 332 exports data of the on-disk DB 63 via the DB buffer 336 (SP501). The location information management unit 333 then exports the reserved physical storage location information of the reserve instruction list 61 via the reserve instruction list buffer 335 (SP502) and the data replication request unit 334 issues a request to read the exported data to the in-memory DB management apparatus 2 (SP503).

Next, the on-disk DB management apparatus 3 discriminates whether all the data of the on-disk DB 63 and all the reserved physical storage location information of the reserve instruction list 61 have been read (SP504). When an affirmative result is obtained in Step SP504, the processing is terminated. If a negative result is obtained in Step SP504, the on-disk DB management apparatus 3 returns to Step SP501.

Accordingly, the on-disk DB management apparatus 3 exports all the data of the on-disk DB 63 and all the reserved physical storage location information of the reserve instruction list 61 and issues a request to read the exported data to the in-memory DB 236.

On the other hand, if the DB access analysis unit 231 of the in-memory DB management apparatus 2 receives the request issued by the on-disk DB management apparatus 3 in Step SP503 (SP601), the DB access processing unit 262 carries out the export of the data in the on-disk DB 63 to the table 2361 of the in-memory DB 236 (SP602). Thereafter, the location information management unit 263 creates an index 2362 (SP603), creates a reserved list 235 on the basis of the reserve physical storage location information thus read (SP604), and the processing is terminated.

(3-6) Reserve Instruction List Creation Processing

Figure 12:
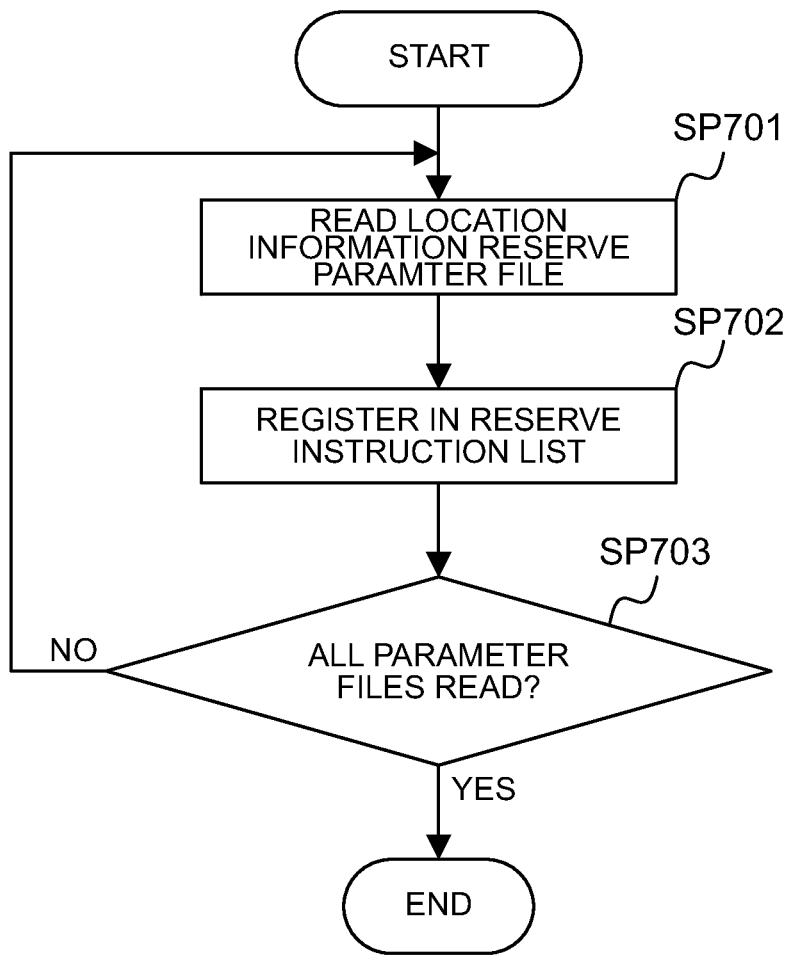
FIG. 12 is a flowchart serving to illustrate reserve instruction list creation processing.

At this point, processing in which the on-disk DB management apparatus 3 creates the reserve instruction list 61 will be described referring to FIG. 12.

Firstly, the location information management unit 333 of the on-disk DB management apparatus 3 reads the location information reserve parameter file 62 created by the user (SP701) and registers the content of the parameter file in the reserve instruction list 61 (SP702). The on-disk DB management apparatus 3 discriminates whether all of the location information reserve parameter file 62 has been read (SP703). If an affirmative result is obtained in Step SP703 (SP703: YES), the processing is terminated. If a negative result is obtained in Step SP703 (SP703: NO), returns to Step SP701.

As explained above, the user can create a plurality of location information reserve parameter files 62, and is able to create the reserve instruction list 61 from the plurality of location information reserve parameter files 62.

(3-7) Reserved List Supplementation Processing

Figure 13:
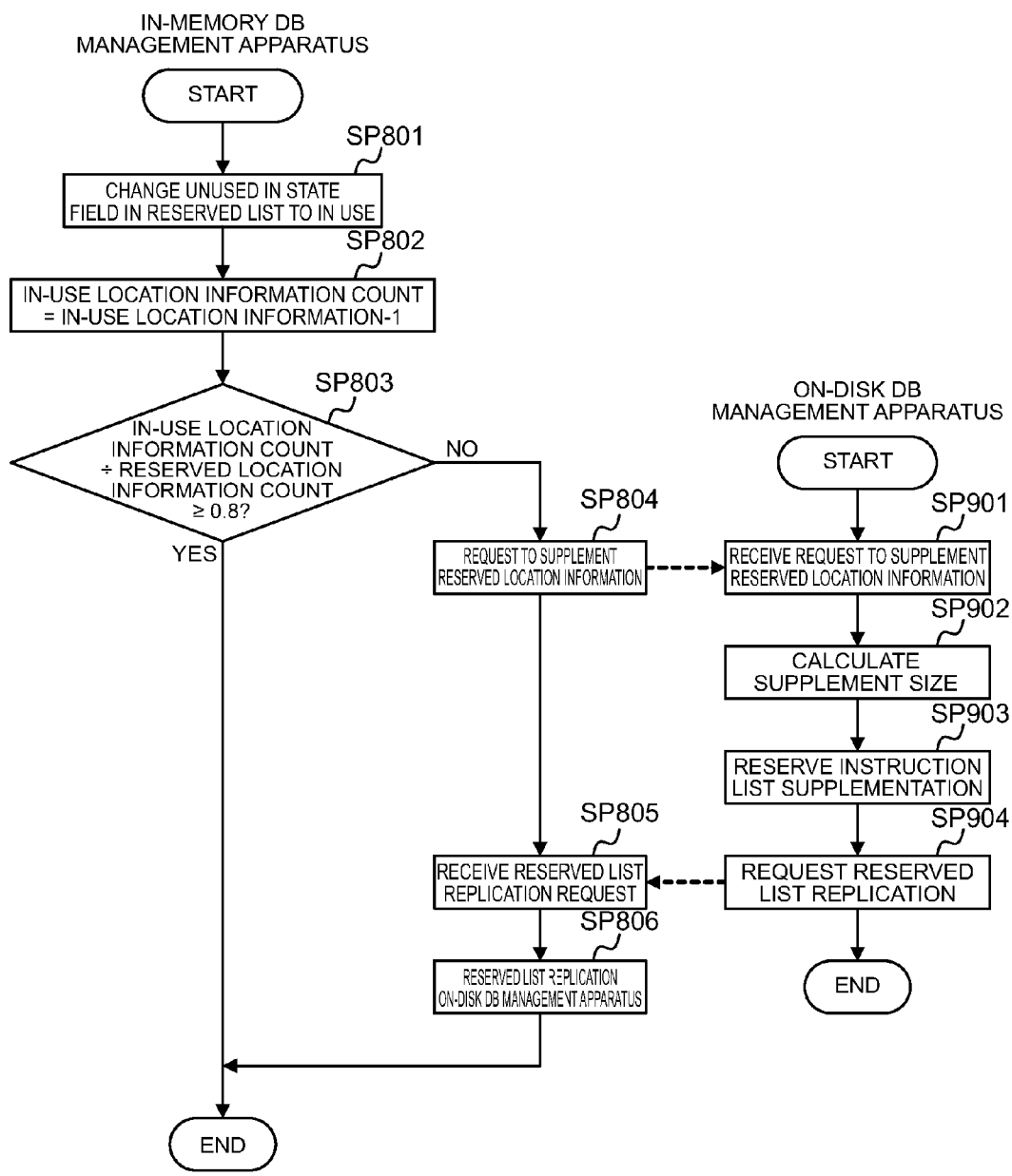
FIG. 13 is a flowchart serving to illustrate reserved list supplementation processing.

At this point, reserved list supplementation processing to supplement the physical storage location if the physical storage location of the reserved list 235 is small will be described with reference to FIG. 13. This processing is started when the location information management unit 233 acquires reserved physical storage location information from the reserved list 235 in Step SP104.

Initially, if the reserved physical storage location information is acquired from the reserved list 235, the location information management unit 233 of the in-memory DB management apparatus 2 changes the state of the leading information among the location information items in an unused state in the reserved list 235 to in use (SP801).

Next, the location information management unit 233 then subtracts "1" from the in-use physical storage location information count 2354 of the reserved list 104 (SP802). The location information management unit 233 discriminates whether the usage rate which is the percentage of the in-use physical storage location information count in the reserved physical storage location information count is 80 percent or more (SP803).

If a negative result is obtained in Step SP803 (that is, if the usage rate is 80 percent or more (SP803: YES)), it is determined that a supplementation is not required and the processing is terminated at that point of time.

If an affirmative result is obtained in Step SP803 (that is, if the usage rate is less than 80% (SP803: NO)), the location information management unit 233 issues a request to the on-disk DB management apparatus 3 to supplement the reserved physical storage location information (SP804), receives the reserved list replication request from the on-disk DB management apparatus 3 (SP805), replicates and supplements the reserved list 235 (SP806), and ends the processing.

On the other hand, upon receipt of the request to supplement the reserved physical storage location information (SP901), the location information management unit 333 of the on-disk DB management apparatus 3 calculates the supplementation size (SP902). The calculation of the supplementation size is performed using the following equation, for example.

The reserved physical storage location information to be supplemented=the pre-supplemented reserved physical storage location information count×0.2.

Thereafter, the location information management unit 333 secures a physical storage location in the on-disk DB 63 in an capacity corresponding to the calculated supplementation size, supplements the reserved physical storage location information of the reserve instruction list 61 (SP903), issues a request to replicate the reserved list 235 to the in-memory DB management apparatus 2 (SP904), and ends the processing. Accordingly, if there is a lot of in-use reserved physical storage location information, unused reserved physical storage location information can always be secured by securing and supplementing the physical storage location information.

FIG. 14 is a diagram showing an example of the result of displaying the reserved physical storage location information. The reserved physical storage location information can be classified in each table of the in-memory DB 236. For example, the user uses an interface such as a command interface to display, in table units, the table name, usage rate of the reserved physical storage location information, and in-use location information. The reserved physical storage location information is retrieved from the reserve instruction list 61 by the location information management unit 333 of the on-disk DB management apparatus 3. The location information is configured from files, extents, pages, and records. The usage rate of the reserved physical storage location information is found by the location information management unit 233 of the in-memory DB management apparatus 2 by means of the following equation from the reserved list 235.

Usage rate of reserved physical storage location information=in-use physical storage location information count÷reserved physical storage location information count.

(5) Other Embodiments

On an aside, in the embodiment explained above, the reserved list 235 is held in a table format, this list may also be held in an index format.

Figure 15:
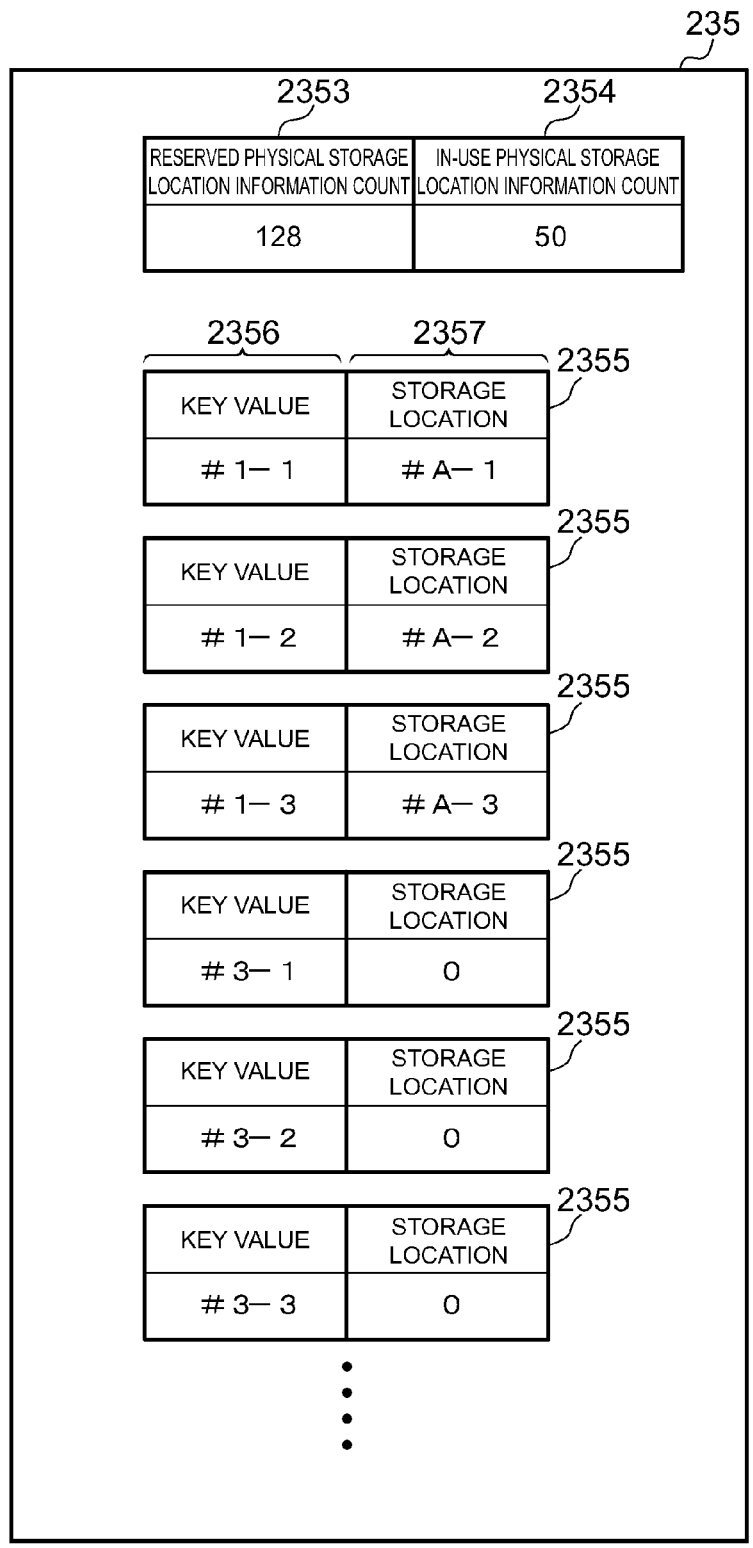
FIG. 15 is a diagram serving to illustrate a reserved list according to another embodiment.

In this case, as shown in FIG. 15, the index entry 2355 constituting the index can be implemented by holding the reserved physical storage location information as an index key 2356 and holding physical storage location information 2357 together with the index key 2356. By the way, the index key 2356 indicates a storage location of a record in the on-disk DB 63, and a storage location of a record in the in-memory DB 236 corresponding to this storage location of the record in the on-disk DB 63 is indicated by the physical storage location information 2357. If the physical storage location 2357 is "0", this indicates that the storage location in the in-memory DB 236 indicated by the reserved physical storage location information is unused.

Also, in the embodiment above the physical storage location information 632 in the on-disk DB 63 is used as an index, however, if unique indexes exist ensuring uniqueness between the data stored by the in-memory DB 236 and the data stored by the on-disk DB 63, such unique indexes may also be used.

Figure 16:
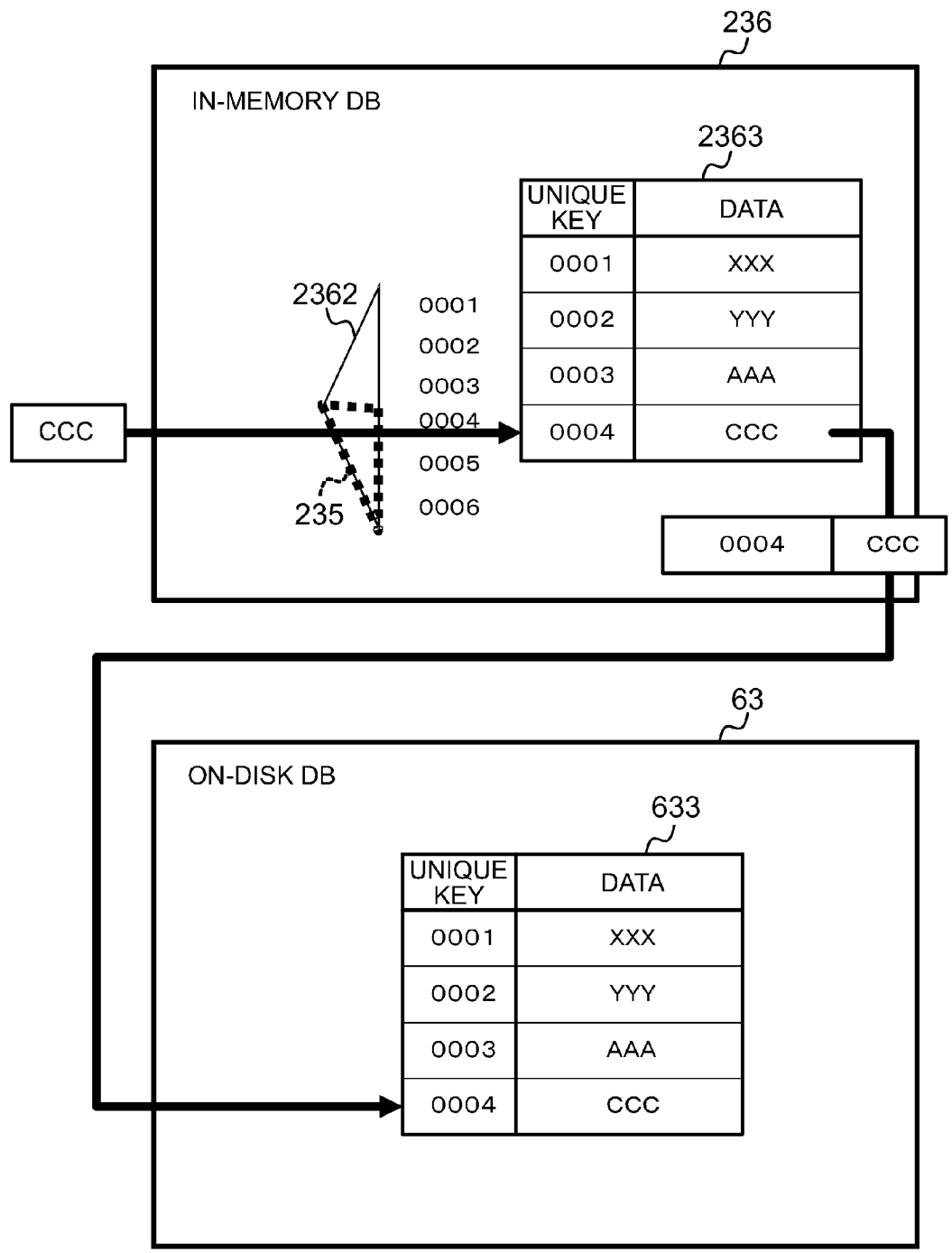
FIG. 16 is a conceptual diagram serving to illustrate the operation of a database management system according to another embodiment.

FIG. 16 is a conceptual diagram showing processing for updating the in-memory DB where the unique key exists. The in-memory DB 236 receives a request to add a record ("CCC" in the example of FIG. 16) and adds the record "CCC" to the table 2363 together with the unique key ("0004" in the example of FIG. 16) acquired from the reserved list 235.

Afterwards, the unique key "0004" is appended to the record "CCC" and a record addition request is issued to the on-disk DB 63. The on-disk DB 63 subsequently stores the record "CCC" in the physical storage location where the unique key "0004" has been appended.

As mentioned above, if the table already holds a unique key, the unique key can be used as physical storage location information and data can be replicated.

REFERENCE SIGNS LIST

1 Database management system
2 In-memory DB management apparatus
3 On-disk DB management apparatus
4 Terminal apparatus
5 Network
6 External storage apparatus
61 Reserve instruction list
63 On-disk database
235 Reserved list
236 In-memory database

The invention claimed is:

1. A database management method for a system in which a first database management apparatus including a primary memory where a first database is disposed and a second database management apparatus including a secondary memory where a second database is disposed are coupled via a network and the first and second database management apparatuses copy stored data to and from one another,
the first database management apparatus including a first list which holds storage location information indicating a write destination in the second database for data which is added to the first database,
the first database management apparatus further comprising an index including storage location information which indicates the storage location of the data in the second database which associates the data stored by the first database with the data stored by the second database,
the database management method comprising:
a first step whereby the first database management apparatus, when optional data is added to the first database, appends the storage location information from the first list to the data;
a second step whereby the first database management apparatus transmits the data to which the storage location information has been appended to the second database management apparatus and issues a request to add the data to the second database management apparatus;
a third step whereby the second database management apparatus adds the data to the storage location in the second database indicated by the storage location information appended to the data in response to the data addition request from the second database management apparatus;
a fourth step whereby the first database management apparatus, when data stored in the first database is updated or deleted, refers to the index and appends the storage location information in the second database to the data, transmits the data to the second database management apparatus, and requests an update or deletion of the data; and
a fifth step whereby the second database management apparatus updates or deletes the data which exists in the storage location of the second database indicated by the storage location information in response to the data update or deletion request from the first database management apparatus, wherein the second database management apparatus comprises a second list which holds the storage location information held in the first list, wherein the second database management apparatus adds the data to a storage location other than the storage location indicated by the storage location information held in the second list if a request to add data to the second database is made, and appends the storage location information of the storage location where the data is added to the data and transmits the resulting data to the first database management apparatus, wherein the first database management apparatus adds the storage location information to the index and adds the data to the in-memory database if the data and the storage location information appended to the data are received.

2. The database management method according to claim 1, wherein the storage location information associates the data of the first database with the data of the second database, and uses a unique key to the data stored by the first and second databases.

3. The database management method according to claim 1, wherein the second database management apparatus includes a second list which holds, according to an user operation, storage location information which indicates a write destination in the second database for the data added to the first database, wherein the second database management apparatus, when the first database is created, transmits the storage location information held by the second list to the first database management apparatus, and wherein the first database management apparatus creates the list on the basis of the received storage location information.

4. The database management method according to claim 1, wherein the first database management apparatus calculates the proportion which the storage location information where the data is written represents of the storage location information held in the list, and issues a request to the second database management apparatus to supplement the storage location information held by the first list if the proportion is equal to or more than a predetermined threshold, wherein the second database management apparatus secures a new write destination in the second database for the data added to the first database if the supplementation is required, and transmits the new write destination storage location information thus secured to the first database management apparatus, wherein the first database management apparatus supplements the first list with the received storage location information of the new write destination.

5. The database management method according to claim 4, wherein the second database management apparatus secures the new write destination in the second database for the data added to the first database so that the number of the storage location information items held in the first list is a predetermined multiple if the supplementation is required, and transmits the secured new write destination storage location information to the first database management apparatus.

6. The database management method according to claim 1, wherein the second database management apparatus, if the data is updated or deleted from the second database, appends the storage location information of the data to the data, transmits the resulting data to the first database management apparatus, and requests that the data be updated or deleted, and wherein the first database management apparatus, if the data and the storage location information appended to the data are received, refers to the index and updates or deletes the data in the first database which corresponds to the received storage location information.

7. A database management system comprising:

a first database management apparatus including a primary memory where a first database is disposed; and a second database management apparatus including a secondary memory where a second database is disposed are coupled via a network and the first and second database management apparatuses copy stored data to and from one another, the first database management apparatus including a first list which holds storage location information indicating a write destination in the second database for data which is added to the first database, the first database management apparatus further comprising an index including storage location information which indicates the storage location of the data in the second database which associates the data stored by the first database with the data stored by the second database, wherein the first database management apparatus, when optional data is added to the first database, is configured to append the storage location information from the first list to the data;

the first database management apparatus is configured to transmit the data to which the storage location information has been appended to the second database management apparatus and issue a request to add the data to the second database management apparatus;

the second database management apparatus is configured to add the data to the storage location in the second database indicated by the storage location information appended to the data in response to the data addition request from the second database management apparatus;

the first database management apparatus, when data stored in the first database is updated or deleted, is configured to refer to the index and append the storage location information in the second database to the data, transmit the data to the second database management apparatus, and request an update or deletion of the data;

the second database management apparatus is configured to update or delete the data which exists in the storage location of the second database indicated by the storage location information in response to the data update or deletion request from the first database management apparatus;

the second database management apparatus comprises a second list which holds the storage location information held in the first list;

the second database management apparatus is configured to add the data to a storage location other than the storage location indicated by the storage location information held in the second list if a request to add data to the second database is made, and append the storage location information of the storage location where the data is added to the data and transmits the resulting data to the first database management apparatus; and the first database management apparatus is configured to add the storage location information to the index and add the data to the in-memory database if the data and the storage location information appended to the data are received.

8. The database management system according to claim 7, wherein the storage location information associates the data of the first database with the data of the second database, and uses a unique key to the data stored by the first and second databases.

9. The database management system according to claim 7, wherein the second database management apparatus is configured to include a second list which holds, according to an user operation, storage location information which indicates a write destination in the second database for the data added to the first database,
wherein the second database management apparatus, when the first database is created, is configured to transmit the storage location information held by the second list to the first database management apparatus, and
wherein the first database management apparatus is configured to create the list on the basis of the received storage location information.

10. The database management method according to claim 7,
wherein the first database management apparatus is configured to calculate the proportion which the storage location information where the data is written represents of the storage location information held in the list, and issue a request to the second database management apparatus to supplement the storage location information held by the first list if the proportion is equal to or more than a predetermined threshold,
wherein the second database management apparatus is configured to secure a new write destination in the second database for the data added to the first database if the supplementation is required, and transmit the new write destination storage location information thus secured to the first database management apparatus,
wherein the first database management apparatus is configured to supplement the first list with the received storage location information of the new write destination.

11. The database management method according to claim 10,
wherein the second database management apparatus is configured to secure the new write destination in the second database for the data added to the first database so that the number of the storage location information items held in the first list is a predetermined multiple if the supplementation is required, and transmit the secured new write destination storage location information to the first database management apparatus.

12. The database management method according to claim 7,
wherein the second database management apparatus, if the data is updated or deleted from the second database, is configured to append the storage location information of the data to the data, transmit the resulting data to the first database management apparatus, and request that the data be updated or deleted, and
wherein the first database management apparatus, if the data and the storage location information appended to the data are received, is configured to refer to the index and update or delete the data in the first database which corresponds to the received storage location information.

13. A non-transitory computer readable storage medium storing a computer-readable program for a system in which a first database management apparatus including a primary memory where a first database is disposed and a second database management apparatus including a secondary memory where a second database is disposed are coupled via a network and the first and second database management apparatuses copy stored data to and from one another,
the first database management apparatus including a first list which holds storage location information indicating a write destination in the second database for data which is added to the first database,
the first database management apparatus further comprising an index including storage location information which indicates the storage location of the data in the second database which associates the data stored by the first database with the data stored by the second database,
the computer-readable program comprising:
computer-readable instructions to append, by the first database management apparatus, the storage location information from the first list to the data, when optional data is added to the first database;
computer-readable instructions to transmit, by the first database management apparatus, the data to which the storage location information has been appended to the second database management apparatus and issue, by the first database management apparatus, a request to add the data to the second database management apparatus;
computer-readable instructions to add, by the second database management apparatus, the data to the storage location in the second database indicated by the storage location information appended to the data in response to the data addition request from the second database management apparatus;
computer-readable instructions, when data stored in the first database is updated or deleted, to
refer, by the first database management apparatus, to the index;
append, by the first database management apparatus, the storage location information in the second database to the data;
transmit, by the first database management apparatus, the data to the second database management apparatus; and
request, by the first database management apparatus, an update or deletion of the data; and
computer-readable instructions to update or delete, by the second database management apparatus, the data which exists in the storage location of the second database indicated by the storage location information in response to the data update or deletion request from the first database management apparatus,
wherein the second database management apparatus comprises a second list which holds the storage location information held in the first list,
wherein the second database management apparatus adds the data to a storage location other than the storage location indicated by the storage location information held in the second list if a request to add data to the second database is made, and appends the storage location information of the storage location where the data is added to the data and transmits the resulting data to the first database management apparatus,
wherein the first database management apparatus adds the storage location information to the index and adds the data to the in-memory database if the data and the storage location information appended to the data are received.

14. The non-transitory computer readable storage medium according to claim 13,
wherein the storage location information associates the data of the first database with the data of the second database, and uses a unique key to the data stored by the first and second databases.

15. The non-transitory computer readable storage medium according to claim 13,
wherein the second database management apparatus includes a second list which holds, according to an user operation, storage location information which indicates a write destination in the second database for the data added to the first database,
wherein the second database management apparatus, when the first database is created, transmits the storage location information held by the second list to the first database management apparatus, and
wherein the first database management apparatus creates the list on the basis of the received storage location information.

16. The non-transitory computer readable storage medium according to claim 13,
wherein the first database management apparatus calculates the proportion which the storage location information where the data is written represents of the storage location information held in the list, and issues a request to the second database management apparatus to supplement the storage location information held by the first list if the proportion is equal to or more than a predetermined threshold,
wherein the second database management apparatus secures a new write destination in the second database for the data added to the first database if the supplementation is required, and transmits the new write destination storage location information thus secured to the first database management apparatus,
wherein the first database management apparatus supplements the first list with the received storage location information of the new write destination.

17. The non-transitory computer readable storage medium according to claim 16,
wherein the second database management apparatus secures the new write destination in the second database for the data added to the first database so that the number of the storage location information items held in the first list is a predetermined multiple if the supplementation is required, and transmits the secured new write destination storage location information to the first database management apparatus.

18. The non-transitory computer readable storage medium according to claim 13,
wherein the second database management apparatus, if the data is updated or deleted from the second database, appends the storage location information of the data to the data, transmits the resulting data to the first database management apparatus, and requests that the data be updated or deleted, and
wherein the first database management apparatus, if the data and the storage location information appended to the data are received, refers to the index and updates or deletes the data in the first database which corresponds to the received storage location information.

* * * * *